US 8,491,052 B2

(12) United States Patent
Werner

(10) Patent No.: US 8,491,052 B2
(45) Date of Patent: Jul. 23, 2013

(54) VEHICLE HEAD RESTRAINT

(75) Inventor: Hans-Georg Werner, Langenfeld (DE)

(73) Assignee: Johnson Controls GmbH, Burscheid (DE)

( * ) Notice: Subject to any disclaimer, the term of this patent is extended or adjusted under 35 U.S.C. 154(b) by 430 days.

(21) Appl. No.: 12/675,963

(22) PCT Filed: Aug. 27, 2008

(86) PCT No.: PCT/EP2008/007026
§ 371 (c)(1),
(2), (4) Date: Sep. 15, 2010

(87) PCT Pub. No.: WO2009/030414
PCT Pub. Date: Mar. 12, 2009

(65) Prior Publication Data
US 2011/0084524 A1    Apr. 14, 2011

(30) Foreign Application Priority Data
Aug. 31, 2007   (DE) .................. 10 2007 041 521

(51) Int. Cl.
*B60N 2/42*   (2006.01)
*B60R 21/00*  (2006.01)
*B60R 22/28*  (2006.01)

(52) U.S. Cl.
USPC ............... 297/216.12; 297/391; 297/404

(58) Field of Classification Search
USPC ................... 297/216.12, 391, 404
See application file for complete search history.

(56) References Cited

U.S. PATENT DOCUMENTS

| | | | |
|---|---|---|---|
| 2,973,029 A | 2/1961 | Schlosstein | |
| 2005/0077762 A1 | 4/2005 | Kraemer et al. | |
| 2008/0272631 A1* | 11/2008 | Hartlaub | 297/216.12 |
| 2009/0315370 A1* | 12/2009 | Hartlaub | 297/216.12 |
| 2010/0164262 A1* | 7/2010 | Okimura et al. | 297/216.12 |
| 2010/0244510 A1* | 9/2010 | Schmitz | 297/216.12 |

FOREIGN PATENT DOCUMENTS

| | | | |
|---|---|---|---|
| DE | 3900495 A1 | | 7/1990 |
| DE | 19923909 A1 | | 1/2000 |
| DE | 19941712 C1 | | 10/2000 |
| DE | 102004016474 B3 | | 8/2005 |
| DE | 10 2006 019 176 | * | 4/2006 |
| DE | 102006001143 B3 | | 4/2007 |
| EP | 0974484 A | | 1/2000 |

OTHER PUBLICATIONS

WIPO,Publication with International Search Report, WO2009/030414 A3, Mar. 13, 2009.
Patent Treaty Cooperation; International Preliminary Report on Patentability (English Translation); PCT/EP2008/007026; Mar. 24, 2010.

* cited by examiner

*Primary Examiner* — David Dunn
*Assistant Examiner* — Philip Gabler
(74) *Attorney, Agent, or Firm* — Butzel Long

(57) ABSTRACT

A head restraint for a vehicle seat includes a first subsection facing the occupant's head, and is displaceable due to application of a predetermined force. A third subsection includes a central hub portion that supports the second subsection. The second subsection is arranged between the first subsection and a third subsection, and is mounted to the central hub portion of the third section and the first second and third subsections are rotatably displaceable about an axis of rotation that is parallel to the direction of displacement (C). A blocking device includes a toothed portion complimentarily engaged with a spacer device on the third subsection and having a resilient member preventing engagement of the toothed portion by the spacer device when the first subsection is not subjected to the application of the predetermined force, and also controls movement of the first subsection counter to a direction of displacement.

17 Claims, 7 Drawing Sheets

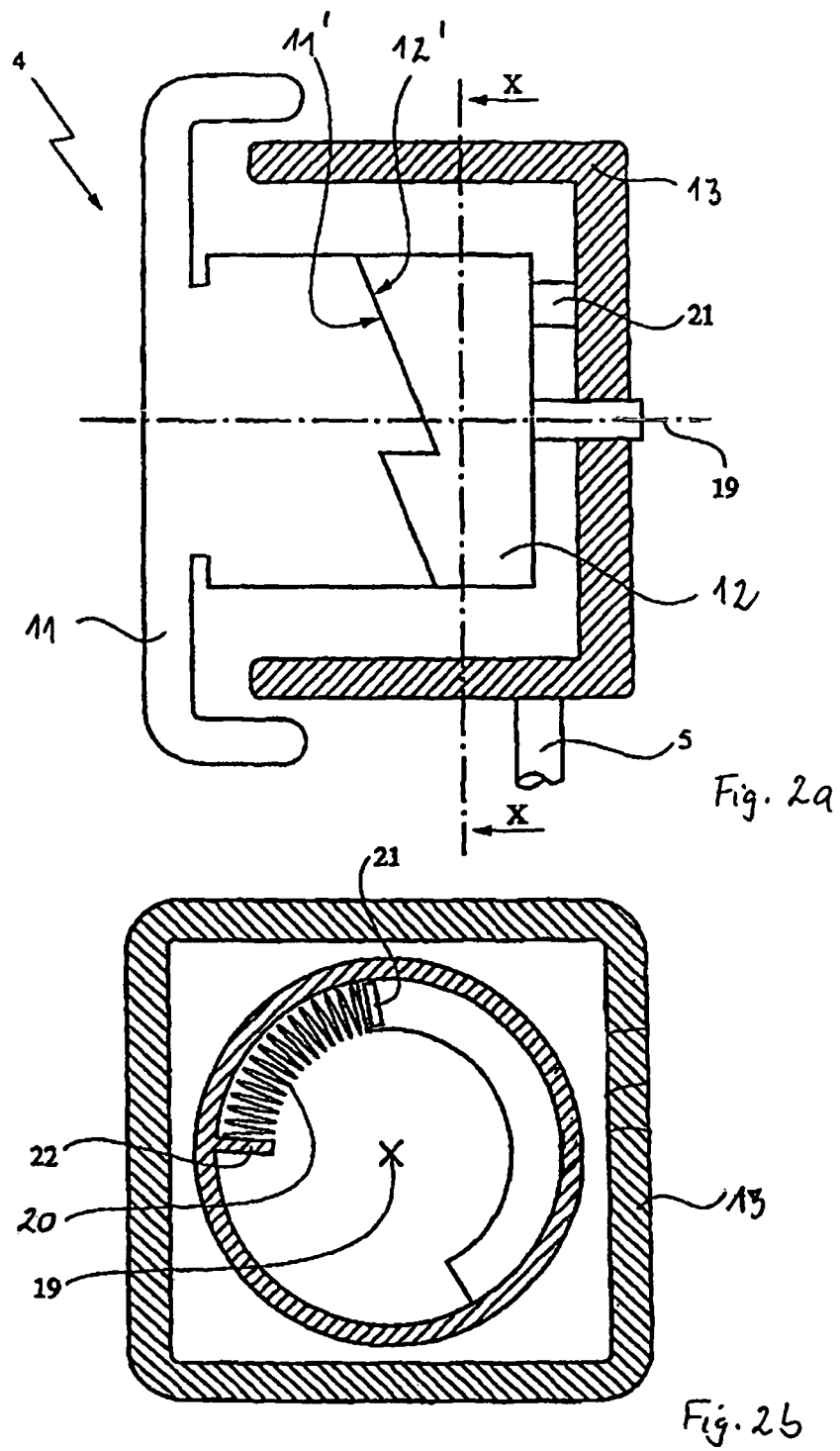

VEHICLE HEAD RESTRAINT

CROSS REFERENCE TO RELATED APPLICATIONS

The present application is a U.S. National Stage filing of International Application PCT/EP2008/007026, filed on Aug. 27, 2008, titled "Head Restraint For A Vehicle" which claims priority to German Patent Application No. DE 10 2007 041 521.6, filed Aug. 31, 2007, the entire disclosures of which are incorporated by reference.

BACKGROUND

The present application relates to a vehicle seat, and in particular to a displaceable head restraint for a vehicle seat.

A head restraint for a vehicle seat includes at least one subsection which faces the head of the seat occupant, and may be displaced, because of an accident, from a use position towards the head of the seat occupant into a safety position under the action of a drive device.

Various examples of displaceable head restraints are known such as the head restraint disclosed in the publication DE 199 23 909 A1 which consists of a base body rigidly connected to the backrest of the vehicle seat via retaining bars. In the event of an accident, the padded segment is moved in a translatory manner towards the head of the seat occupant in order to prevent a whiplash effect. The force required therefor is produced by a spring pretensioned in the direction of displacement within a telescopic guide device. Another example of a head restraint is disclosed in the published patent specification DE 39 00 495 A1 in which a padded segment may be pivoted forward relative to the base body about a fixed axis of rotation, in the event of an accident. A spring-loaded piston/cylinder arrangement is used as a drive device in combination with a supporting lever, in which the piston rod is articulated to the base body in the region of the axis of rotation and the cylinder is articulated to the padded segment. Still another example of a head restraint is further disclosed in the publication DE 199 41 712 C1, in which a displaceable padded element is connected to the base body via a scissor-like mechanism, so that the padded element may be moved forward from a resting position into a use position. Yet another example of a head restraint is disclosed in the publication DE 10 2004 016 474 B3. In this example, subsections of the head restraint are moved apart in a telescopic manner in order to adopt a safety position of the head restraint.

Thus, there is a need in the art for a head restraint that controls movement of the first subsection of the head rest counter to the direction of displacement.

SUMMARY

Accordingly, a head restraint for a vehicle seat includes a first subsection facing the occupant's head, and is displaceable due to application of a predetermined force, from a use position into a safety position. A third subsection is connected to the vehicle seat, and includes a central hub portion having a plurality of outwardly extending bearing ribs to support the second subsection. The second subsection is arranged between the first subsection and a third subsection, and is mounted to the central hub portion of the third section and the first second and third subsections are rotatably displaceable about an axis of rotation that is parallel to the direction of displacement (C). A blocking device includes a toothed portion of the second subsection that is complimentarily engaged with a spacer device located on the third subsection and the spacer device includes at least one resilient member that prevents engagement of the toothed portion of the second subsection by the spacer device when the first subsection is not subjected to the application of the predetermined force, to control movement of the first subsection counter to a direction of displacement.

An advantage of the present disclosure is that a head restraint with a drive device is provided which is of simple and compact design and which is effective in protecting the head of the seated occupant in the event of a sudden force.

Another advantage of the present disclosure is that a head restraint for a vehicle seat is provided, in which a first subsection of the head restraint, may be displaced from a use position towards the head of the seat occupant along a direction of displacement into a safety position under the action of a relative movement of a second subsection of the head restraint, which subsection is arranged substantially between the first subsection and a third subsection, the relative movement of the subsections being a rotation about an axis of rotation substantially parallel to the direction of displacement. Still another advantage of the present disclosure is that a blocking device is provided for blocking or reducing a movement of the first subsection of the head restraint in a direction that is counter to the direction of displacement. Still a further advantage is that a head restraint for a vehicle seat is provided in which bearing ribs are arranged on a centrally located hub on the third subsection. A spacer is also provided to reduce the friction when moving the subsections relative to one another. A further advantage of the present disclosure is that, smoother actuation of the safety device is possible, so that weight, size or cost of the actuating devices and/or actuators may be optimized.

Still a further advantage of the present disclosure is that the spacer device includes at least one resilient device that prevents an engagement of the toothings, when the first subsection is not subjected to any substantial loading as a result of the blocking to reduce the friction when actuating the head restraint.

In another example, the resilient device is produced by means of metal resilient elements injection-molded around the second subsection and/or the third subsection. A spacer element is displaceable parallel to the direction of displacement and preloaded by a spring to reduce friction.

In still another example, an energy storage device or flat spring is disposed between the second and third subsections and/or between the first and second subsections. The flat spring may be pretensioned either for the displacement of the first subsection into the safety position, in the event of an accident, or is pretensioned in order to adjust the use position.

Other features and advantages of the present disclosure will be readily appreciated, as the same becomes better understood after reading the subsequent description taken in conjunction with the accompanying drawings.

BRIEF DESCRIPTION OF THE FIGURES

FIGS. 2a to 2d are sectional views of a drive device in various operating positions for the head restraint shown in FIG. 1.

DESCRIPTION

Figure 1:
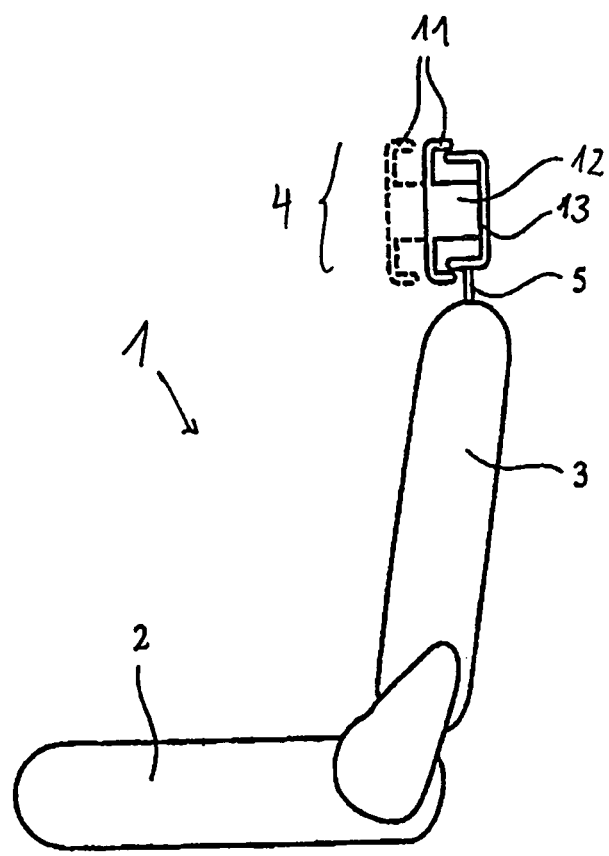
FIG. 1 is an elevational side view of a vehicle seat with a head restraint.

According to FIG. 1, a vehicle seat 1 is provided with a head restraint 4 according to the disclosure. The vehicle seat includes a seat part 2 and a backrest 3 connected thereto. In an example, the inclination of the head restraint 4 may be adjusted. A head restraint is connected to the backrest 3, such as by retaining bars 5. However, alternatively other fastening options (not shown) may be provided between the backrest 3 and the head restraint 4. In this example, the pair of retaining bars 5 of the head restraint 4 may be pivotably connected in the upper region of the backrest 3 or in the region of the head restraint 4 via an articulation (not shown) to the backrest 3 and/or to the head restraint 4.

The head restraint 4 has at least one first subsection 11 facing the head of the seat occupant. A second subsection 12 of the head restraint 4 is located substantially between the first subsection 11 and a third subsection 13. The second subsection 12 may be displaced from a use position (shown by a solid line in FIG. 1) towards the head of the seat occupant in a direction of displacement into a safety position (shown by a dotted line in FIG. 1). The first subsection 11 may be a padded element against which the head of the seat occupant may rest and/or be supported. The third subsection of the head restraint is a base body for the head restraint, and is connected to the backrest 3 via the retaining bars 5. The third subsection may be connected rigidly or in a height-adjustable manner and/or an inclination-adjustable manner, or the like. Inside the head restraint 4, a drive device disclosed in detail hereinafter causes the displacement of the first subsection 11 in a direction of movement C towards the head of the seat occupant.

Figure 2C:
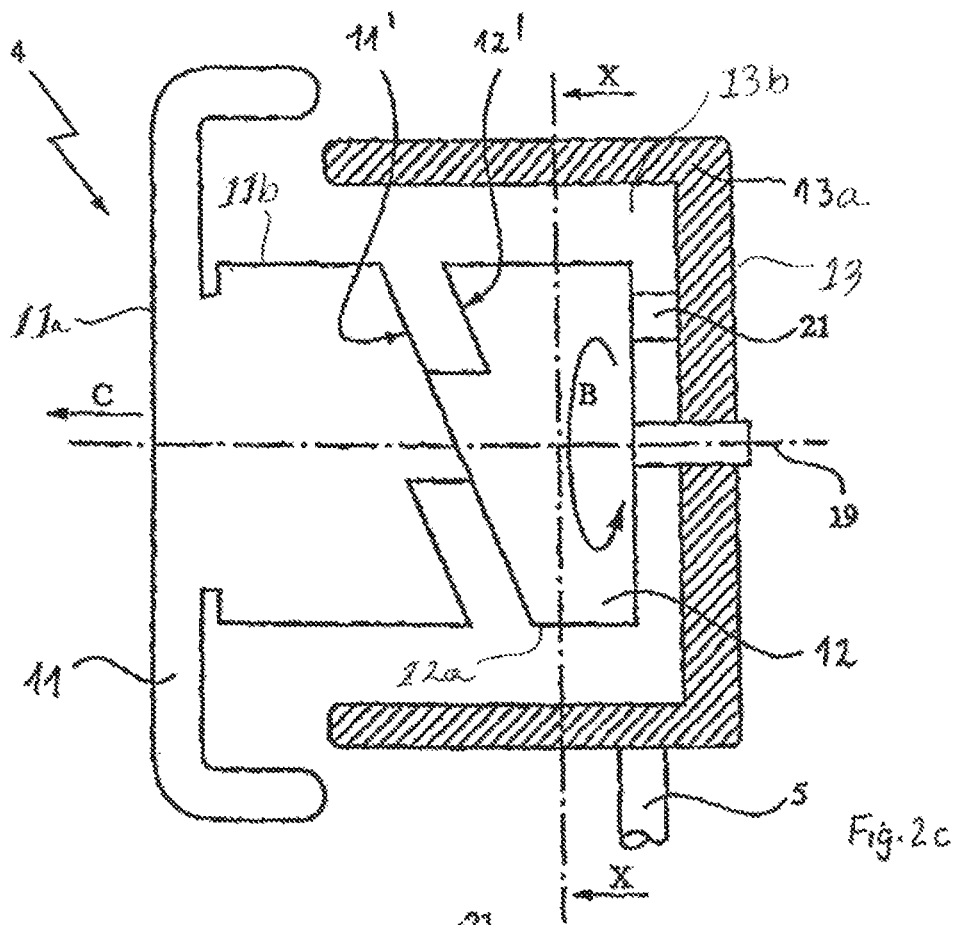
Figure 2D:
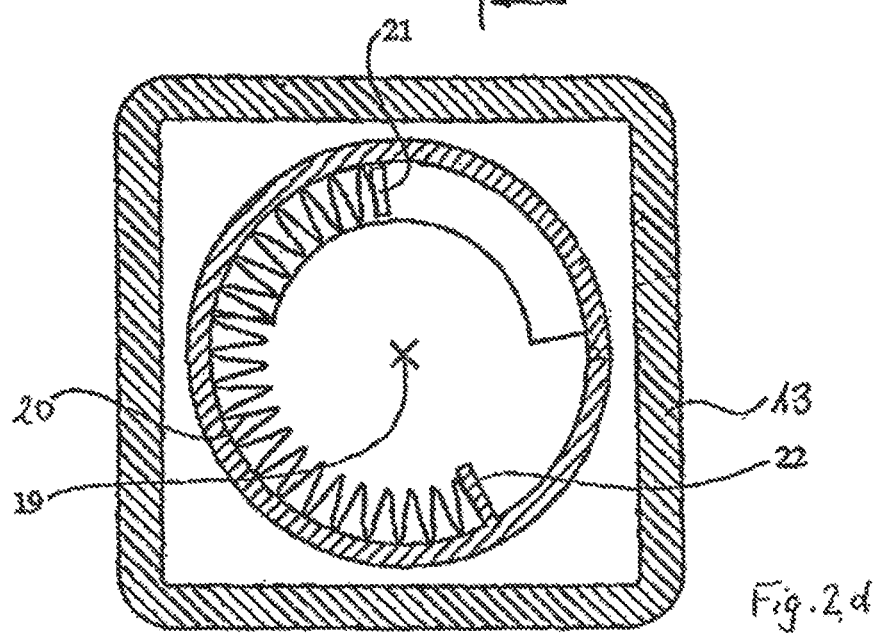

According to FIGS. 2a to 2d, the relative movement of the subsections 11, 12, 13 of the head restraint 4 are shown in more detail schematically. In this connection, FIGS. 2a and 2b show the head restraint in the use position and FIGS. 2c and 2d show the head restraint in the safety position. Displacement of the first subsection 11 in the direction of the seat occupant, is shown at C. FIG. 2b illustrates a front sectional view of the head restraint 4 in a lateral sectional view along line X-X of FIG. 2a. FIG. 2d illustrates a front sectional view of the head restraint 4 in a lateral sectional view along line X-X of FIG. 2c. The first subsection includes a padded portion 11a facing the seated occupant connected to a body 11b.

The drive device is disposed within the second subsection 12 of the head restraint 4. The second subsection 12 is connected rotatably about an axis of rotation shown at 19 to the third subsection 13 and/or base body of the head restraint 4. The second subsection includes a body portion shown at 12a. Likewise, the third subsection includes a body portion shown at 13a, and the second subsection is received within the interior space of the third subsection body portion 13a, as shown at 13b. The first subsection 11 includes an oblique surface 11' that is adjacent a corresponding oblique surface 12' formed in the second subsection 12. A spring 20, which may be pretensioned, is located in the interior space 13b region between a first contact point 21 and a second contact point 22. The distance between the first contact point 21 and second contact point 22 depends on the pretensioning of the spring. After the release of a locking device, not shown, the spring effects a movement of the first subsection from the use position into the safety position or a movement from the safety position into the use position. In the event of an application of a force, such as due to an accident (FIG. 2c, FIG. 2d) the second subsection 12 is rotated relative to the third subsection 13 (arrow B). In operation, oblique surfaces rubbing against one another between the first subsection 11 and the second subsection 12 and/or between the second subsection 12 and the third subsection 13 produce an axial force and a forward displacement of the first subsection along the axis of rotation 19 in the direction of the arrow C. The front faces of the first subsection 11 and/or of the second subsection 12, denoted by 11' and/or 12' and facing one another, each include sawtooth-like oblique surfaces that are configured such that a blocking of the first subsection 11 takes place in its fully extended or partially extended position in the direction of movement C, when a force acts on the first subsection moving back said first subsection into the use position. Similar toothed oblique surfaces may be provided, either alternatively or in addition to their arrangement between the first subsection 11 and the second subsection 12, between oblique surfaces (not shown in FIGS. 2a to 2d) between the second subsection 12 and the third subsection 13.

Figure 3:
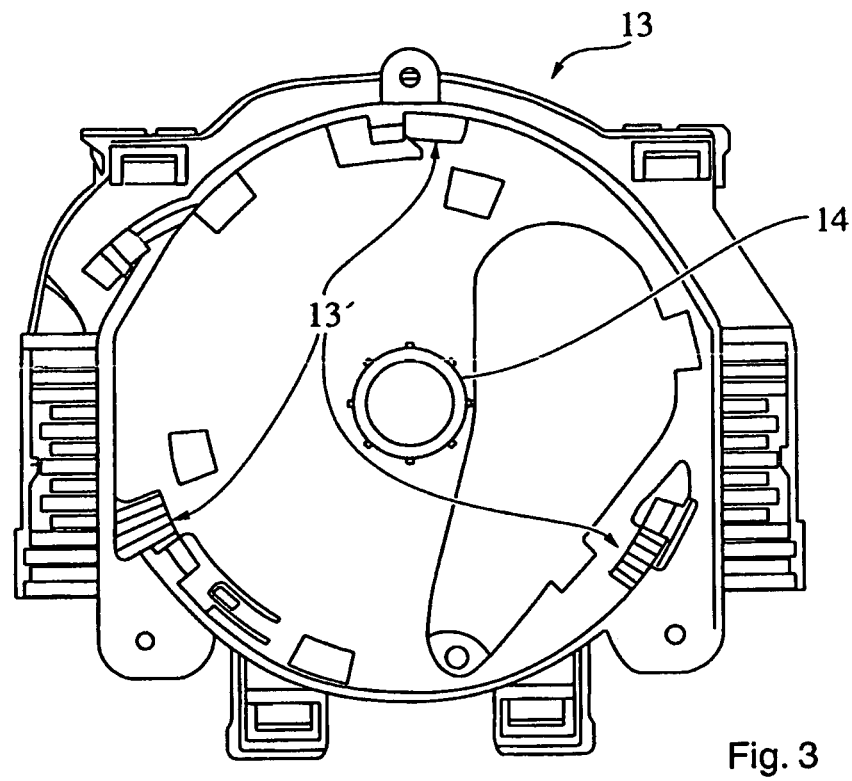
FIG. 3 is a plan view of the third subsection for the head restraint of FIG. 1.
Figure 4:
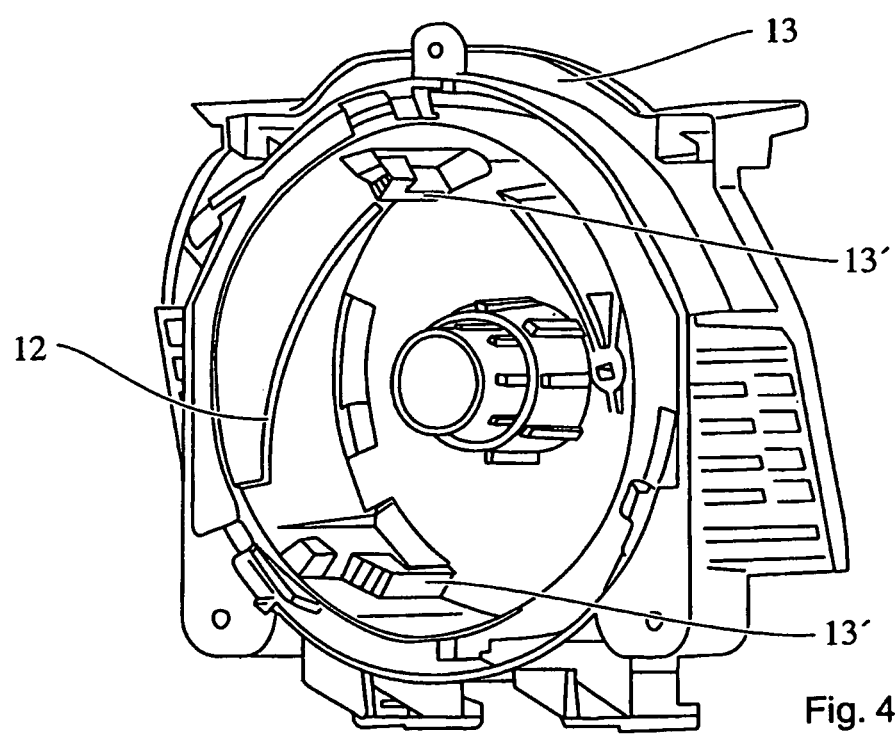
FIG. 4 is a perspective view of the second and third subsections for the head restraint of FIG. 1.
Figure 8:
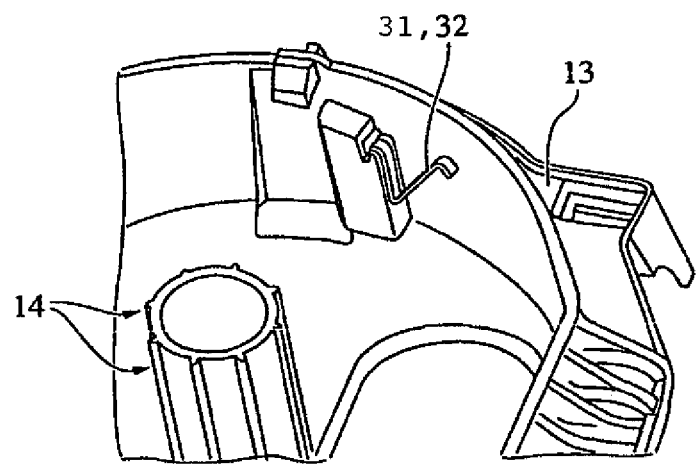
FIG. 8 is a perspective view of the resilient member of FIG. 6.
Figure 9:
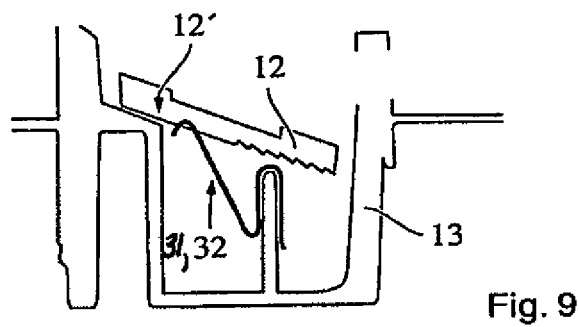
FIG. 9 is a sectional view of the resilient member of FIG. 8.

Referring to FIGS. 3 and 4, another exemplary embodiment of the present disclosure is illustrated. In this example, as shown in FIG. 3 the third subsection 13 includes an oblique surface 13 formed on an interior wall of the third subsection 13. The oblique surface has a sawtooth shape and the oblique surfaces 13' of the third subsection 13, cooperate with corresponding oblique surfaces (not shown) of the second subsection 12. The third subsection includes a centrally located hub, as shown at 35, for receiving the second subsection 12. The centrally located hub includes a plurality of outwardly projecting bearing ribs 14 spaced circumferentially about the hub, so that the hub acts as a bearing pin. The bearing support surface provided by the bearing ribs 14 enhance the bearing support surface of the second subsection 12. As a result, the second subsection 12 may be formed in a comparatively easily reproducible manner, for example, without the presence of mold-removal burrs. The bearing ribs 14 are also shown in FIG. 8.

Referring to FIGS. 5 to 10, further exemplary embodiments of blocking devices are illustrated for use with the head restraint. In this example, the blocking device is a spacer device 30. In this example, the spacer device 30 prevents the second and third subsections 12, 13 from being pressed against one another under a predetermined condition, such as when the applied force in the direction of the head of the seated occupant does not exceed a predetermined force. In operation, the toothed engagement of the oblique surfaces 12', 13' results in the blocking of the relative movement of the subsections 11, 12, 13 relative to one another.

Figure 5:
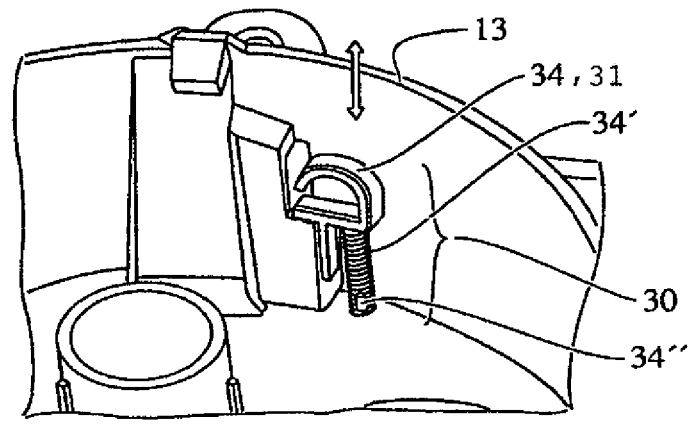
FIG. 5 is a partial view of the third subsection for the head restraint of FIG. 1 illustrating an example of the spacer device.
Figure 6:
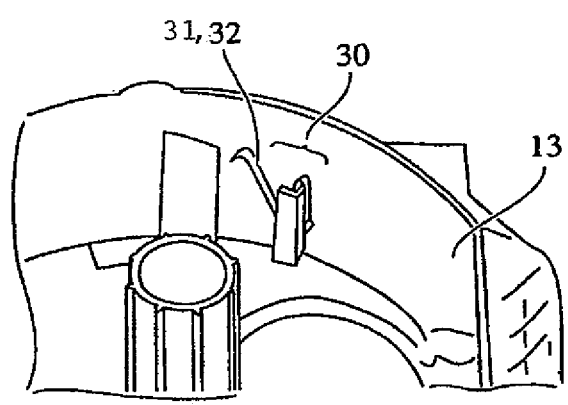
FIG. 6 is a partial view of the third subsection for the head restraint of FIG. 1 illustrating another example of a resilient member.
Figure 7:
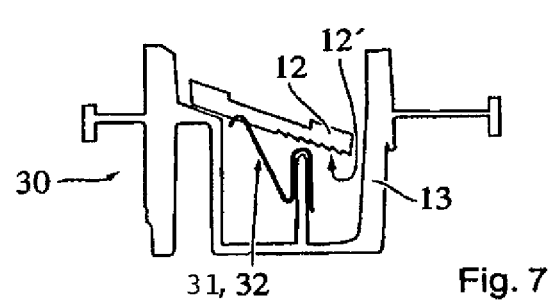
FIG. 7 is a sectional view of the resilient member of FIG. 6.

As illustrated in FIG. 5, the spacer device 30 includes a resilient member 31 such as a spacer element 34 that is displaceable substantially parallel to the direction of displacement C. The spacer element 34 of this example has a "D" shaped head portion connected to an energy storage device, such as a spring 34'. A first end of the spring is connected to the leg portion of the "D" shaped head. The spacer element 34 is pretensioned such as by a spring 34' so that the toothings between the first subsection 11 and the second subsection 12 in the normal case (i.e. without sufficient loading from the sides of the head of a seat occupant) are not in engagement. A second end of the spring 34' is connected to the third subsection, such as by a fastening lug 34" or the like.

Referring to FIGS. 6, 7, 8 and 9 still further embodiments of the spacer device 30 are shown, in which the resilient device 31 also includes one or more resilient elements 32, disposed between the second subsection and the third subsection. For example, the resilient element 32 is a cantilevered arm having one end secured to the third subsection 13 and a second end adjacent the second subsection 12 to space the second subsection 12 from the third subsection 13. The arm may be formed from a metal material or the like. In another example, the resilient element is injection molded onto the third subsection 13.

Figure 10:
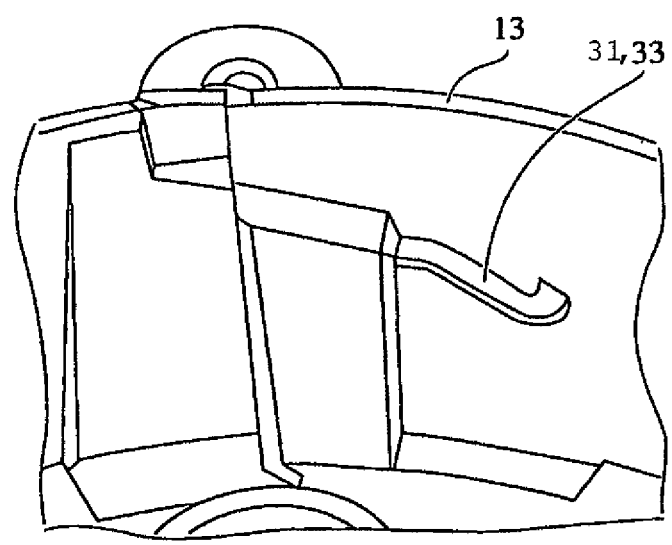
FIG. 10 is a partial view of the third subsection for the head restraint of FIG. 1 illustrating still another example of a resilient member integrally formed with the third subsection.

Referring to FIG. 10, the resilient device 31 is integrally formed with the third subsection 13. For example, the resilient device 31 may be a cantilevered arm 33 having a free end in contact with the second subsection 12 and molded substantially in the same material as third subsection 13, and in the same production step. For example, both the resilient element 33 and third subsection may be formed using an injection-molding process.

Figure 11:
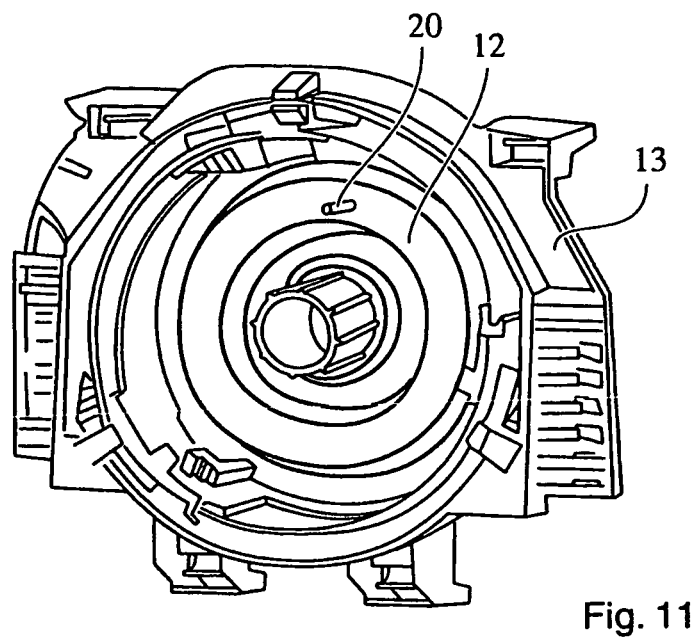
FIG. 11 is a perspective view of the second and third subsections illustrating an energy storage device.
Figure 12:
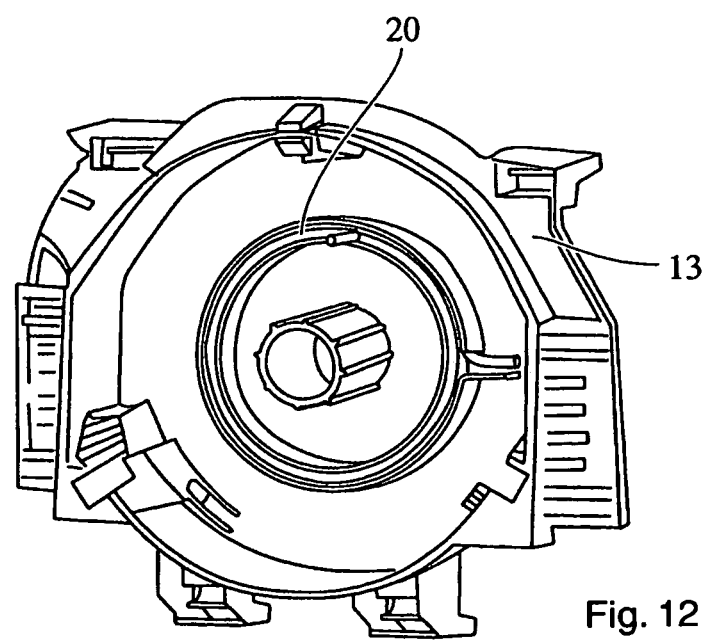
FIG. 12 is a perspective view of the interior of the third subsection illustration the energy storage.

Referring to FIGS. 11 and 12 an energy storage device such as a flat spring 20 is illustrated. The flat spring 20 serves as a drive means for carrying out the relative movement between the second and third subsections 12, 13. The flat spring 20 is disposed between the second and third subsections. In this example, the flat spring 20 is arranged concentric with the central hub of the third subsection, and spaced a predetermined distance therefrom. The flat spring is pretensioned to allow for displacement of the first subsection to a safety position, such as when a predetermined force is applied to the seat. In another example, the flat spring is pretensioned in order to adjust the initial or use position of the head restraint.

Many modifications and variations of the present invention are possible in light of the above teachings. Therefore, within the scope of the appended claims, the present invention may be practiced other than as specifically described.

The invention claimed is:

1. A head restraint for a vehicle seat comprising:
    a first subsection which can be arranged on the vehicle seat to face in a forward direction toward a head of a seat occupant, wherein the first subsection is translationally displaceable in a forward direction into a safety position due to application of a predetermined force;
    a second subsection arranged between the first subsection and a third subsection wherein the third subsection is connected to the vehicle seat, and the second subsection is rotatably displaceable with respect to the first and third subsections about an axis of rotation that is parallel to the direction of displacement; and
    a blocking device formed in the head restraint wherein the blocking device includes a toothed portion of the second subsection that is complimentarily engageable with a spacer device located on the third subsection to counter movement of the first subsection from the safety position.

2. The head restraint of claim 1, wherein the second subsection is mounted to a central hub portion of the third subsection along the axis of rotation, and the central hub portion includes a plurality of outwardly extending bearing ribs arranged circumferentially around the central hub to support the second subsection.

3. The head restraint as set forth in claim 1, wherein the spacer device includes at least one resilient member that prevents engagement of the toothed portion of the second subsection by the spacer device when the first subsection (11) is not subjected to the application of the predetermined force.

4. The head restraint as set forth in claim 3 wherein the resilient member is a cantilevered metal arm supported on the third subsection.

5. The head restraint as set forth in claim 3 wherein the resilient member is a cantilevered arm integrally formed with the third subsection.

6. The head restraint as set forth in claim 3 wherein the resilient member includes a spacer element and a spring having an end attached to the spacer element and the spring displaces the spacer element parallel to the direction of displacement.

7. The head restraint as set forth in claim 1 further comprising an energy storage device positioned between the second and third subsections to displace the second subsection upon application of the predetermined force.

8. The head restraint as set forth in claim 7 wherein the energy storage device is a flat spring pretensioned for the displacement of the first subsection from the use position to the safety position.

9. The head restraint as set forth in claim 8 wherein the flat spring is pretensioned in order to adjust the use position.

10. A head restraint for a vehicle seat comprising:
    a first subsection which can be arranged on the vehicle seat to face in a forward direction toward a head of a seat occupant, wherein the first subsection is translationally displaceable in a forward direction to a safety position due to application of a predetermined force;
    a third subsection connected to the vehicle seat, wherein the third subsection includes a central hub portion having a plurality of outwardly extending bearing ribs arranged circumferentially around the central hub to support a second subsection;
    a the second subsection arranged between the first subsection and a third subsection, wherein the second subsection is mounted to the central hub portion of the third subsection; and
    a blocking device formed in the head restraint wherein the blocking device includes a toothed portion of the second subsection that is complimentarily engageable with a spacer device located on the third subsection to counter movement of the first subsection from the safety position, the second subsection rotatably displaceable about an axis of rotation that is parallel to the direction of displacement.

11. The head restraint as set forth in claim 10, wherein the spacer device includes at least one resilient member that prevents engagement of the toothed portion of the second subsection by the spacer device when the first subsection is not subjected to the application of the predetermined force.

12. The head restraint as set forth in claim 11 wherein the resilient device is a resilient metal arm supported on the third subsection.

13. The head restraint as set forth in claim 11 wherein the resilient member is a cantilevered arm integrally formed with the third subsection.

14. The head restraint as set forth in claim 11 wherein the resilient member includes a spacer element and a spring having an end attached to the spacer element and the spring displaces the spacer element parallel to the direction of displacement.

15. The head restraint as set forth in claim 10 further comprising an energy storage device positioned between the second and third subsections to displace the second subsection upon application of the predetermined force.

16. The head restraint as set forth in claim 15 wherein the energy storage device is a flat spring pretensioned for the displacement of the first subsection from the use position to the safety position.

17. A head restraint for a vehicle seat comprising:
   at least one first subsection, which can be arranged on the vehicle seat to face in a forward direction toward a head of a seat occupant, wherein the first subsection is translationally displaceable in a forward direction due to application of a predetermined force, from a use position in the forward direction into a safety position;
   a third subsection connected to the vehicle seat, wherein the third subsection includes a central hub portion having a plurality of outwardly extending bearing ribs arranged circumferentially around the central hub to support a second subsection;
   the second subsection arranged between the first subsection and a third subsection wherein the second subsection is mounted to the central hub portion of the third section and the second subsection is rotatably displaceable about an axis of rotation that is parallel to the direction of displacement; and
   a blocking device that includes the toothed portion of the second subsection that is complimentarily engageable with a spacer device located on the third subsection and the spacer device includes at least one resilient member that prevents engagement of the toothed portion of the second subsection by the spacer device when the first subsection is not subjected to the application of the predetermined force.

\* \* \* \* \*